(12) United States Patent
Kooima (10) Patent No.: US 12,263,518 B1
(45) Date of Patent: Apr. 1, 2025

(54) INTEGRATED SYSTEM FOR PRODUCING ARTICLES FROM SHEET MATERIAL

(71) Applicant: Philip G. Kooima, Rock Valley, IA (US)

(72) Inventor: Philip G. Kooima, Rock Valley, IA (US)

(73) Assignee: Kooima Company, LLC, Rock Valley, ME (US)

( * ) Notice: Subject to any disclaimer, the term of this patent is extended or adjusted under 35 U.S.C. 154(b) by 152 days.

(21) Appl. No.: 18/152,571

(22) Filed: Jan. 10, 2023

Related U.S. Application Data (60) Provisional application No. 63/298,254, filed on Jan. 11, 2022.

(51) Int. Cl.
| | | |
|---|---|---|
| *B21D 1/05* | (2006.01) | |
| *B21D 35/00* | (2006.01) | |
| *B21D 43/28* | (2006.01) | |
| *B23K 26/362* | (2014.01) | |

(52) U.S. Cl.
CPC ............ *B21D 35/002* (2013.01); *B21D 1/05* (2013.01); *B21D 43/287* (2013.01); *B23K 26/362* (2013.01)

(58) Field of Classification Search
CPC . B21D 1/02; B21D 1/05; B21D 28/06; B21D 35/002; B21D 43/287; B23K 26/362
See application file for complete search history.

(56) References Cited

U.S. PATENT DOCUMENTS

| | | | |
|---|---|---|---|
| 5,436,423 A | 7/1995 | Welty | |
| 6,006,638 A | 12/1999 | Eltringham | |
| 6,205,830 B1 * | 3/2001 | Voges ..................... | B21B 45/06 |
| | | | 72/40 |
| 6,563,081 B2 * | 5/2003 | Pace .................. | B23K 26/0846 |
| | | | 219/121.72 |
| 7,148,446 B2 * | 12/2006 | Harnisch ............ | B23K 26/0846 |
| | | | 219/121.66 |
| 7,802,365 B2 | 9/2010 | McGlinchy | |
| 8,253,064 B2 * | 8/2012 | Beck .................. | B23K 26/0846 |
| | | | 219/121.72 |
| 8,471,175 B2 * | 6/2013 | Finn ................... | B23K 26/0838 |
| | | | 219/121.82 |
| 8,841,578 B2 | 9/2014 | Finn | |
| 9,694,445 B2 | 7/2017 | Chen | |

(Continued)

OTHER PUBLICATIONS

CN 109500235A, LV et al. Mar. 2019.*

(Continued)

*Primary Examiner* — Edward T Tolan
(74) *Attorney, Agent, or Firm* — Jeffrey A. Proehl; Woods, Fuller, Shultz & Smith, PC (57) ABSTRACT

A system for producing parts from a strip of sheet material wound in a coil may have a plurality of stations, including a preliminary station for holding the coil, a first leveling station for receiving the unwound portion of the strip from the preliminary station to manipulate the strip in a manner to reduce an initial curvature of the strip, a cleaning station for cleaning at least a region of one of the strip, and a cutting station positioned along the material path and configured to cut the strip of sheet material, the cutting station being configured to cut the strip of sheet material to form the parts.

16 Claims, 6 Drawing Sheets

(56) References Cited

U.S. PATENT DOCUMENTS

| | | | |
|---|---|---|---|
| 9,815,104 B2* | 11/2017 | Jin | B23K 26/38 |
| 10,486,267 B2* | 11/2019 | Conseil | B23K 26/362 |
| 11,267,078 B2* | 3/2022 | Vandevelde | B23K 26/0869 |
| 2001/0030180 A1 | 10/2001 | Pace | |
| 2004/0108305 A1 | 6/2004 | Harnisch | |
| 2006/0130940 A1* | 6/2006 | Kollaritsch | C22C 38/12 |
| | | | 148/534 |
| 2007/0044531 A1* | 3/2007 | Liefer | B21D 1/02 |
| | | | 72/160 |
| 2012/0067104 A1 | 3/2012 | Keys | |
| 2016/0136715 A1 | 5/2016 | Liebel | |
| 2017/0136513 A1 | 5/2017 | Alber | |

OTHER PUBLICATIONS

CN 111687300A, Liang Sep. 2020.*

Industry News, Sep. 5, 2018, "Corrective Leveler", American Steel Products Company, web page, 3 pages, download date Oct. 25, 2021.

Red Bud Industries, article, "How to Produce Flat Material that Stays Flat", 25 pages, download date Jan. 5, 2022.

The Fabricator, Jan. 16, 2003, "Everything you need to know about flatteners and levelers for coil processing—Part 3", FMA Communications, Inc., Elgin, IL, 14 pages, download date Oct. 25, 2021.

* cited by examiner

INTEGRATED SYSTEM FOR PRODUCING ARTICLES FROM SHEET MATERIAL

REFERENCE TO RELATED APPLICATIONS

This application claims the benefit of U.S. Provisional Patent Application No. 63/298,254, filed Jan. 11, 2022, which is hereby incorporated by reference in its entirety.

BACKGROUND

Field

The present disclosure relates to metal processing apparatus and more particularly pertains to a new an embodiment of a new integrated system for producing articles from sheet material in a manner with enhanced efficiency.

SUMMARY

In one aspect, the present disclosure relates to a system for producing parts from a strip of sheet material wound in a coil, and in which the strip of sheet material having opposite faces. The system may define at least a portion of a material path for movement of the strip. The system may comprise a plurality of stations, and the plurality of stations may include a preliminary station configured to hold the coil of the strip of sheet material. The plurality of stations may further include a first leveling station positioned along the material path and being configured to receive the unwound portion of the strip of sheet material from the preliminary station, and the first leveling station may be configured to manipulate the strip of sheet material passing through the first leveling station in a manner to reduce the initial degree of curvature of the strip of sheet material received from the preliminary station. The plurality of stations may also include a cleaning station positioned along the material path and being configured to clean at least a region of one of the opposite faces of the strip of sheet material. The plurality of stations may still further include a cutting station positioned along the material path and configured to cut the strip of sheet material, the cutting station being configured to cut the strip of sheet material to form the parts.

In some implementations, the first leveling station of the system may comprise a stretcher apparatus configured to manipulate the strip of sheet material by gripping the strip at two spaced locations on the strip and applying a tension force to a portion of the strip material located between the locations to increase the flatness of the portion of the strip between the locations.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

With reference now to the drawings, and in particular to FIGS. 1 through 6 thereof, a new integrated system for producing articles from sheet material embodying the principles and concepts of the disclosed subject matter will be described.

The applicant has developed an integrated material processing system highly suitable for forming parts from sheet material that may minimize if not completely eliminate diversions and interruptions in the flow of the material that typically occurs in part production which almost invariably increase the time, as well as the cost, for producing the parts, as well as increasing the space on the production floor necessary for manufacture due to store the sheet material between various stages of material processing.

Additionally, the system may advantageously permit more efficient utilization of the sheet material by permitting the layout of parts on the sheet material to be based upon significantly longer lengths of the sheet material as compared to conventional material length conventionally available, and the improved layout efficiency may correspondingly decrease the amount of (waste) material cut away from the material used to form the parts. Conventionally, for a manufacturing facility producing finished parts, sheet material is provided to the facility in the form of discrete rectangular sheets of the sheet material. Efficient use of the sheet material depends upon creating a layout of the positions and orientations of the parts to be cut from the plate in a manner that maximizes the use of as much of the sheet material of the plate as possible. However, the layout of the parts to be cut from the plate is constrained by the dimensions of the plate in two directions (e.g., in x- and y-directions) on the sheet. For example, for plates having a given standard width (such as 96 inches), plates of sheet material are often provided in 96 inch, 120 inch, or 144 inch lengths. The limitation in the length of the plate 96, 120, or 144 inch lengths, in combination with the width of the plate, necessarily increases the area of the plate that cannot be utilized for parts due to the lack of additional room on the plate for cutting an additional part. Obviously, the larger the "footprint" of each of the parts being formed, the greater the likelihood that larger portions of the sheet material towards the ends of the plate will not be large enough to form an additional part, and will need to be cut away as waste. Moreover, while increasing the sizes of the plates can minimize the amount of material cut away as waste, larger plate sizes are also more difficult (and potentially more dangerous) to move about the manufacturing facility and require larger storage areas on the work floor. The applicant has determined through simulations of part layouts that implementation of the system may reduce waste sheet material by up to 3 percent to 4 percent or more improvement in material utilization, and when large quantities of parts are being manufactured, even apparently small percent increases in utilization of the sheet material can be significant.

The applicant has also recognized that conventional processing of sheet material typically involves excessive movement of the sheet material between different facilities at different geographic locations, as well as discrete movements of the material once inside a building where the final parts are to be formed, and these movements only serve to increase the all-in cost of the sheet material as well as introducing the potential for delays in movement of the materials to the facility. Conventionally, sheet material is produced and packaged in a coiled form, and shipped across great distances, often in different countries. Typically, an intermediate facility receives the coil of sheet material, and uncoils and flattens (by various machines and techniques) the coiled sheet material and cuts or shears the uncoiled sheet material into much shorter individual sheets of a size more easily handled and transported and stored at a warehouse facility. The sheets of sheet material are then transported to a manufacturing facility where the sheet material is utilized to form finished (or almost finished) parts. Movement of the sheets of sheet material (often as a group or bundle of sheets) typically occurs at the manufacturing facility where parts are produced with the required assistance of an overhead crane or lift, and then handling or movement of individual sheets by hand or by machine assisting the movement, thus increasing the cost of producing the parts, as well as the time needed to produce the parts.

The applicant has also recognized that the system may advantageously incorporate additional processing for the uncoiled sheet material, including processes which may be performed prior to, or even during, cutting operations on the sheet material. These additional processes may include cleaning surface areas of the sheet material and etching surface areas of the sheet material. Illustratively, and advantageously, the cleaning and etching of surface areas of the sheet material may be produced utilizing laser energy applied to the surface of the sheet metal. For example, the laser energy may be utilized to ablate the surface of the sheet material to remove foreign matter, or matter other than the material, from the surface of the material, and may thus avoid the need to "pickle" the sheet material with an acid substance to remove the foreign matter, as well as reducing or eliminating the need to apply a corrosion prevention substance such as oil to the cleaned surface of the sheet material. Such cleaning of the surface or surfaces of the sheet material may be performed across substantially the entire surface of the sheet material, or may be performed on selected areas of the surface of the sheet material so that the clearing is limited to areas of the sheet material utilized to form the parts, while areas of the sheet material destined to become waste are not cleaned. As another example, the laser energy may be utilized to etch or otherwise physically mark the surface of the sheet material for the purpose of, for example, conveying information, or providing an aesthetic character to the surface. Further operations, such as cutting the sheet metal into pieces to form the parts, may also be performed utilizing laser energy.

In one aspect, the disclosure relates to an integrated system 10 for producing or fabricating a part 1, and typically a plurality of parts 1, from a sheet of material, referred to herein as sheet material, and generally having a uniform width between edges and thickness between edges of the sheet material. The system 10 is described in the context of sheet material having the form of a strip 2 of the material having a lateral width which is substantially smaller than the longitudinal length of the material. Typically, the strip 2 of sheet material is provided in the form of a coil 3, and this disclosure of the system 10 is set forth in terms of receiving the strip of sheet material in a coiled form. Significantly, the system 10 may incorporate all or substantially all processing steps between, and including, receiving the sheet material in a coiled form and dispensing or delivering individual parts cut or otherwise formed from the sheet material, without the material deviating or departing from the material path of the processing line of the system.

In general, the strip 2 of sheet material has opposite faces 4, 5 and opposite edges 6, 7 bordering the opposite faces on lateral sides of the faces. The opposite faces 4, 5 may be identical, or substantially identical, to each other in contour and shape, although the conditions in contours of the faces may vary. For the purposes of description, the opposite faces may comprise a first face 4 and a second face 5, and for the purposes of illustration the first face 4 may be an upwardly oriented face and the second face 5 may be a downwardly oriented face. Each of the parts 1 may be produced from the strip 2 of sheet material at a part location 8 on one of the faces of the material. For the purposes of this description, the part location 8 will be described as being located on the first face 4, but it will be recognized that the part 1 will have a part location on the second face 5 generally corresponding to the position of the part location on the first face. A part boundary 9 on the first face 4 of the strip may form an outline of the part 1 to be produced, and cutting or severing the strip 2 along the boundary 9 from the first face through to the second face will free the part from the remainder of the strip 2, particularly when the boundary 9 is a continuous and closed boundary.

The system 10 may define at least a portion of a material path 12 along which the strip of sheet material moves through the system, and at least a portion of the material path defined by the system may extend between an intake 14 where the unprocessed sheet material is received and an output 16 where the parts formed from the sheet material are available for utilization or distribution to other locations. The material path 12 may be continuous and uninterrupted between the intake 14 and output 16, and the strip 2 may move from the intake to the output along the path 12 without deviating from the material path. In some embodiments, the material path 12 may be substantially linear and straight between the intake and the output, although in consideration of this disclosure, other path orientations may be considered useful.

The system 10 may generally comprise a plurality of stations 18 arrayed along the material path 12 between the intake 14 and output 16. The plurality of stations 18 may include a preliminary station 20 which is configured to hold the unprocessed sheet material, such as the coil 3 of the strip 2 of sheet material. The preliminary station 20 may be located at the intake 14 of the path 12. The apparatus of the preliminary station 20 may be configured to support the coil 3 in a manner that permits the coil to rotate to unwind at least a portion of the strip 2 of sheet material from the coil. A wound portion of the strip 2 of sheet material may be located on the coil and an unwound portion of the strip (being unwound from the coil) may extend along the material path 12. The preliminary station 20 may support the coil 3 of sheet material in a manner such that the faces 4, 5 of the unwound portion of the strip are generally horizontally oriented, although the unwound portion may leave the coil 3 with an initial degree of curvature retained from being in a coiled condition.

The system 10 may further include a first station 22 positioned along the material path 12 and which may be configured to receive the unwound portion of the strip 2 of sheet material from the preliminary station 20. The first station 22 may be a leveling station configured to manipulate the strip of sheet material passing through the first leveling station in a manner that reduces the initial degree of curvature of the strip received from the preliminary station. The first station 22 may have a first station entry 24 and a first station exit 26, and the strip 2 may pass through the station 22 between the entry 24 and exit 26. The first station entry 24 may be oriented toward the preliminary station 20, and the strip 2 leaving the station 20 may enter the station 22 through the entry 24. In some embodiments, the first station 22 may comprise a first leveler apparatus 28 which is configured to manipulate the strip of sheet material, such as by passing the strip between a plurality of rolls of the apparatus 28 provided for engaging the opposite faces of the strip of sheet material. Illustratively, the plurality of rolls may be configured to sequentially bend the strip 2 in opposite directions to remove internal stresses from the strip that may cause "memory" in the sheet material of the coiled and contribute to a (somewhat) curved condition of the material unwound from the coil. The leveling functionality of the leveler apparatus 28 may be accomplished as the strip of sheet material moves, or continues to move, along the material path 12.

The system 10 may also include a second station 30 positioned along the material path 12 and which may be configured to receive the unwound portion of the strip 2 of sheet material passing from the first station exit 26 of the first station 22. The second station 30 may also be configured to manipulate the strip of the sheet material passing through the station in a manner intended to decrease or remove irregularities in the strip of sheet material. The second station 30 may have a second station entry 32 and a second station exit 34, and the strip 2 may pass through the station 30 from the entry 32 to the exit 34. In some embodiments, the second station 30 may comprise a stretcher apparatus 36 which is configured to manipulate the strip 2 of sheet material, such as by gripping the strip 2 at two spaced locations on the strip and applying a tension force to the strip material located between the locations to produce an additional degree of flattening of the portion of the sheet material located between the locations at which the material is gripped. Typically, the stretching operation performed by the stretcher apparatus 36 is initiated when the strip 2 of sheet material is held substantially stationary on the material path 15. Illustratively, the stretcher apparatus 36 may have two parts 38, 40 with the parts being located at spaced locations along the material path to grip or otherwise engage spaced locations of the strip of sheet material in a manner which permits the application of a typically high degree of tension to the portion of the strip located between the spaced locations.

Figure 1:
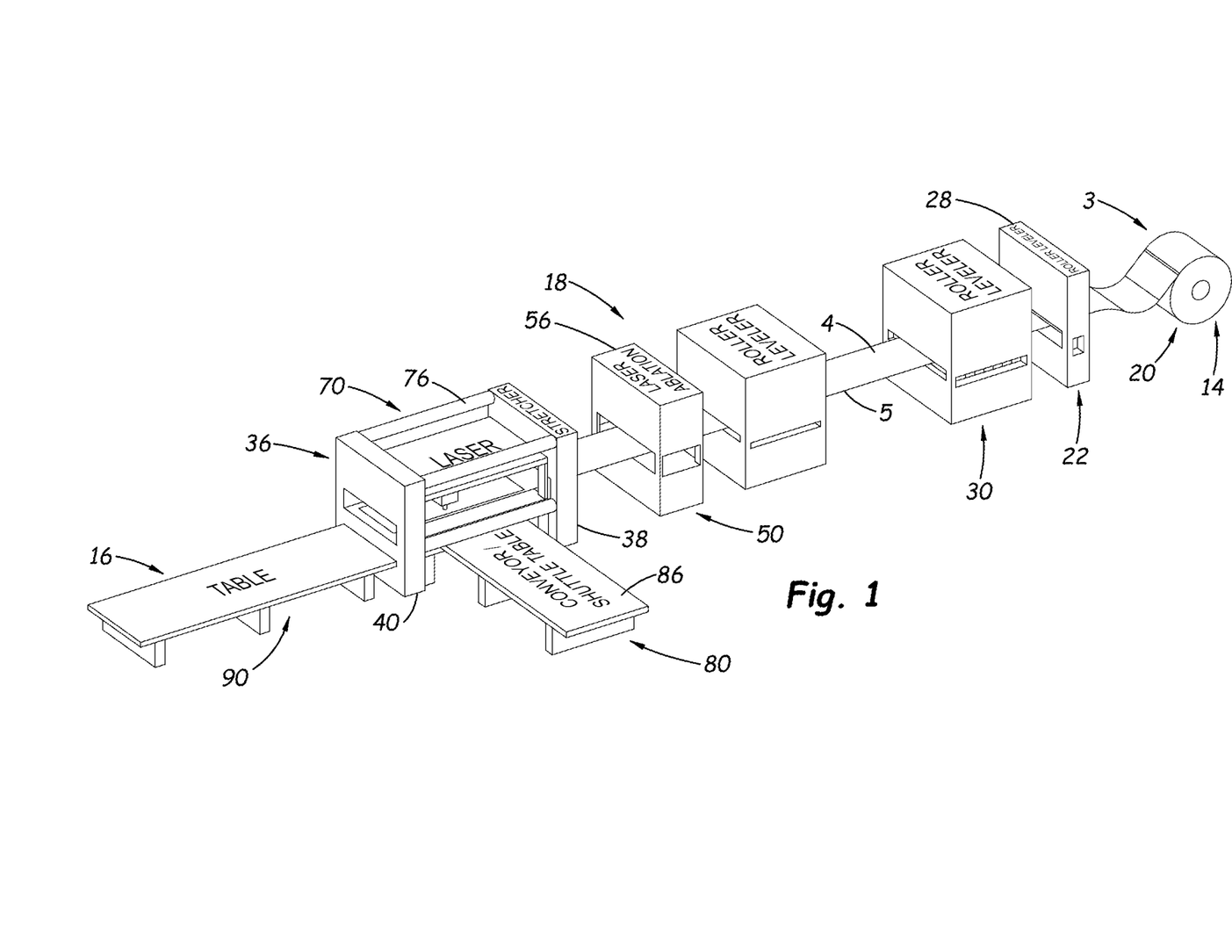
FIG. 1 is a schematic perspective diagrammatic view of an embodiment of a new integrated system for producing articles from sheet material according to the present disclosure.
Figure 2:
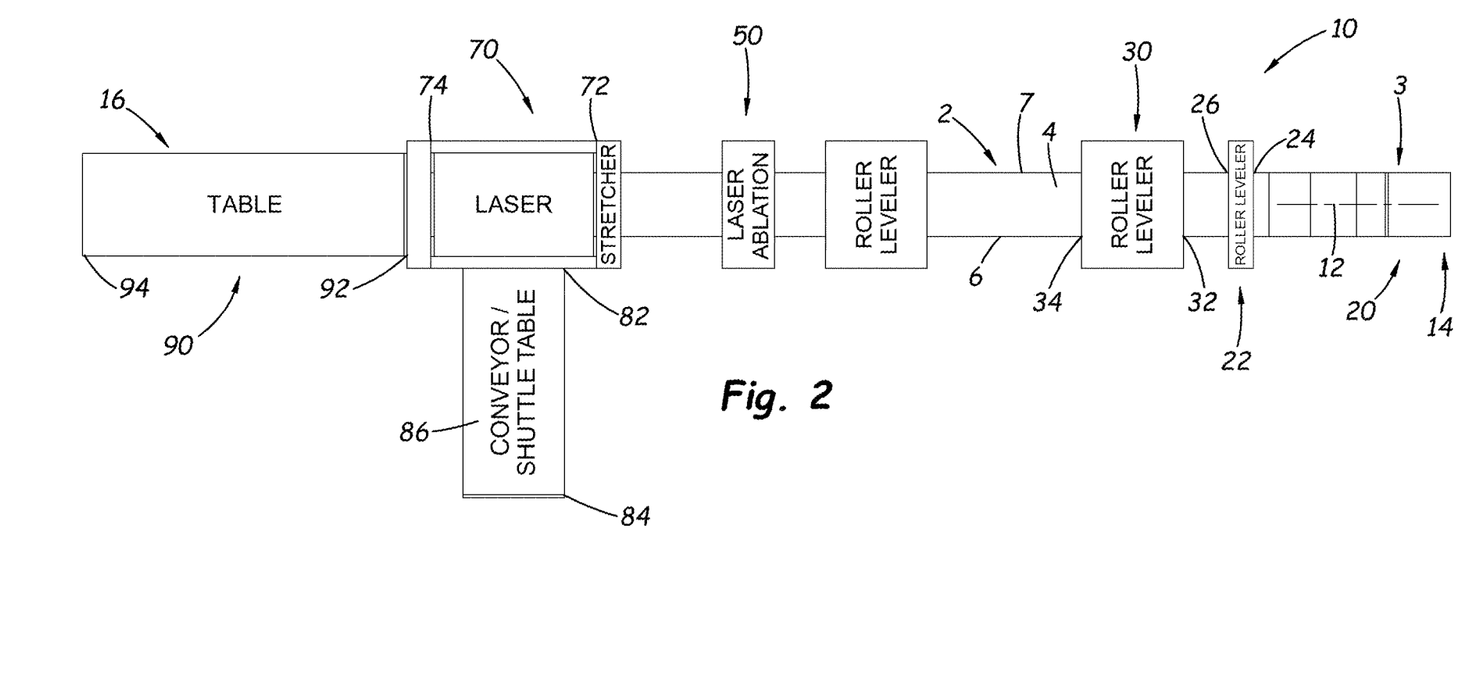
FIG. 2 is a schematic top diagrammatic view of the embodiment of the system according to the illustrative embodiment of FIG. 1.
Figure 3:
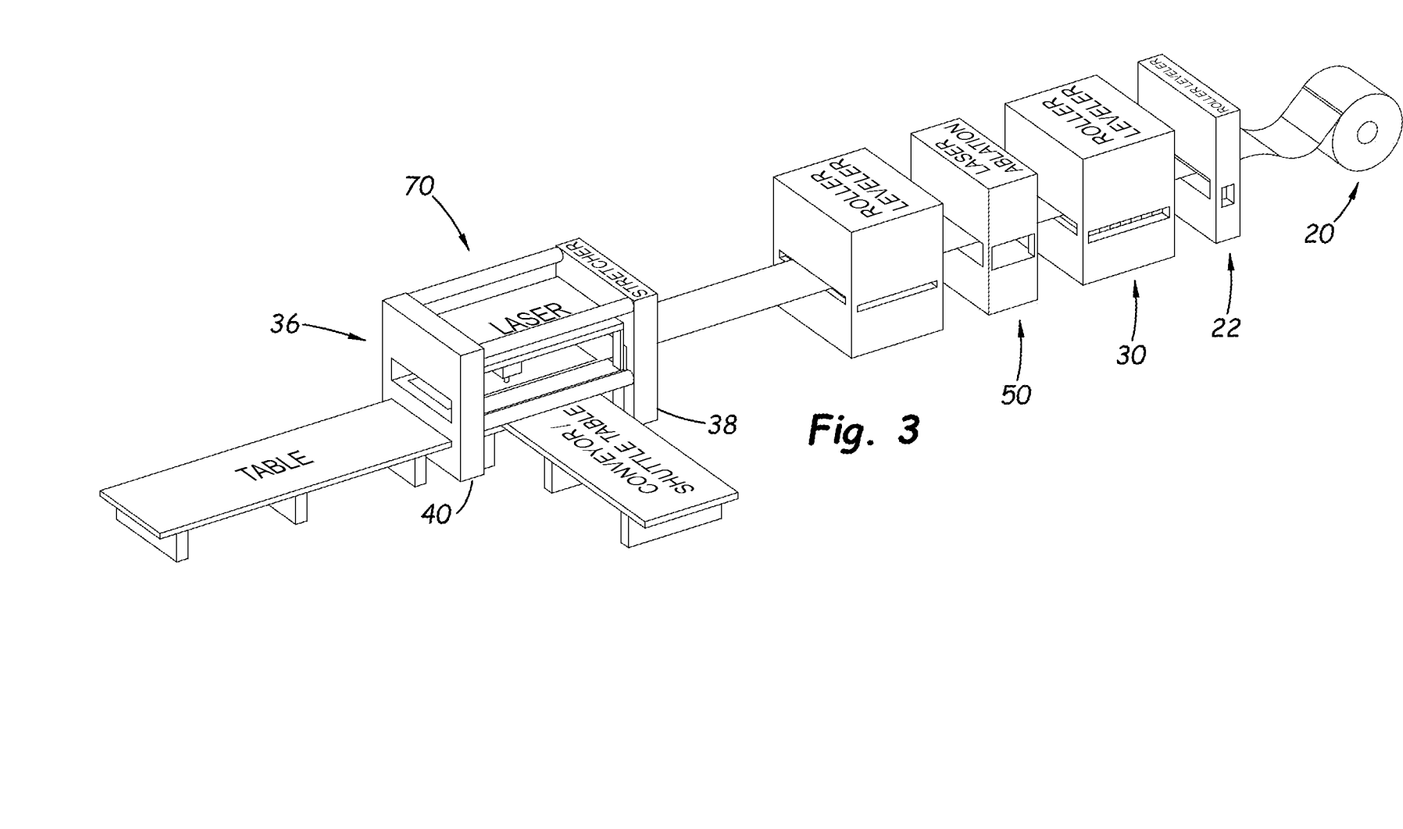
FIG. 3 is a schematic perspective diagrammatic view of another embodiment of the new system for producing articles from sheet material.
Figure 4:
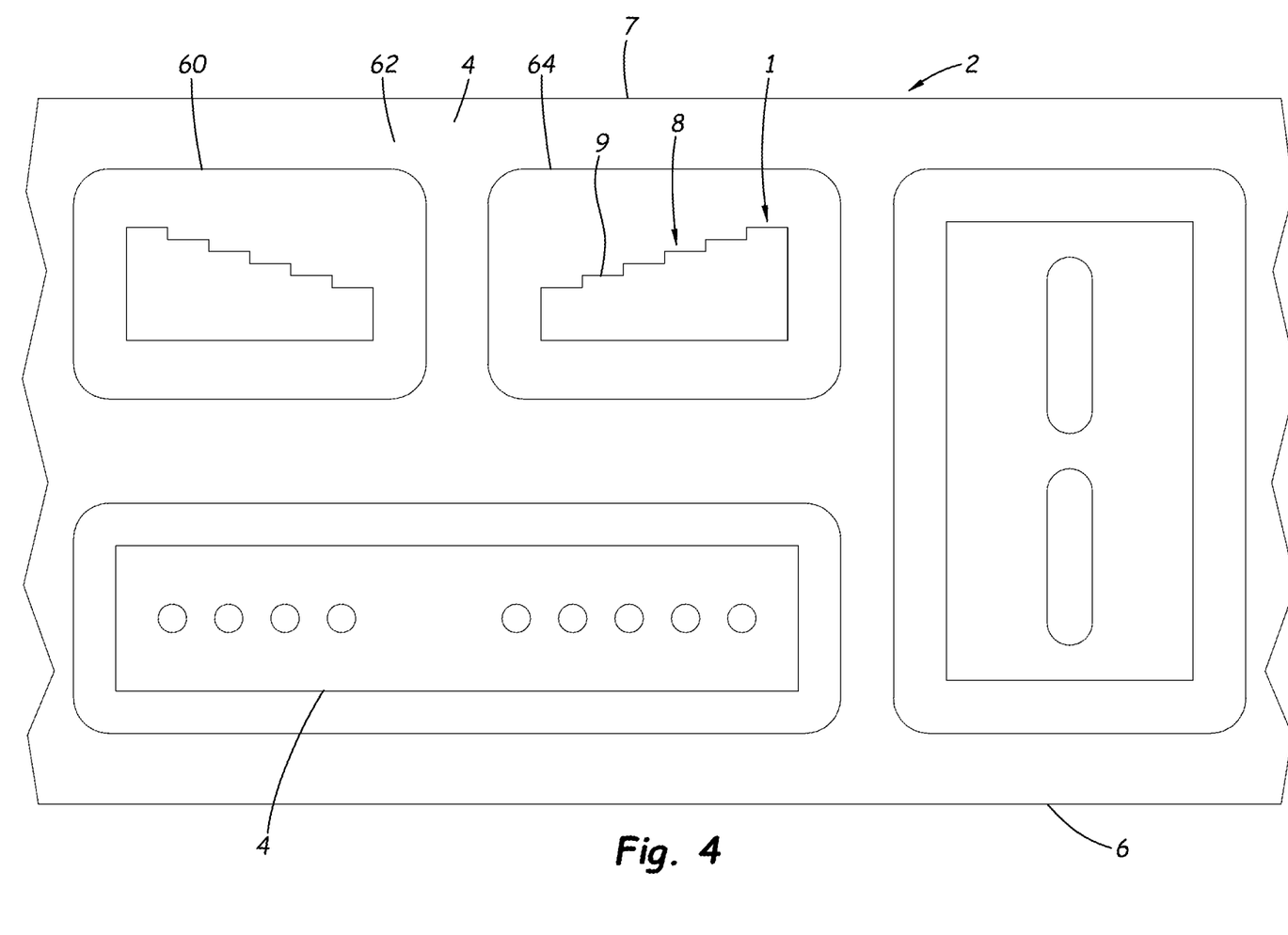
FIG. 4 is a schematic top view of a portion of a strip of sheet material processed on the system, according to an illustrative embodiment.
Figure 5A:
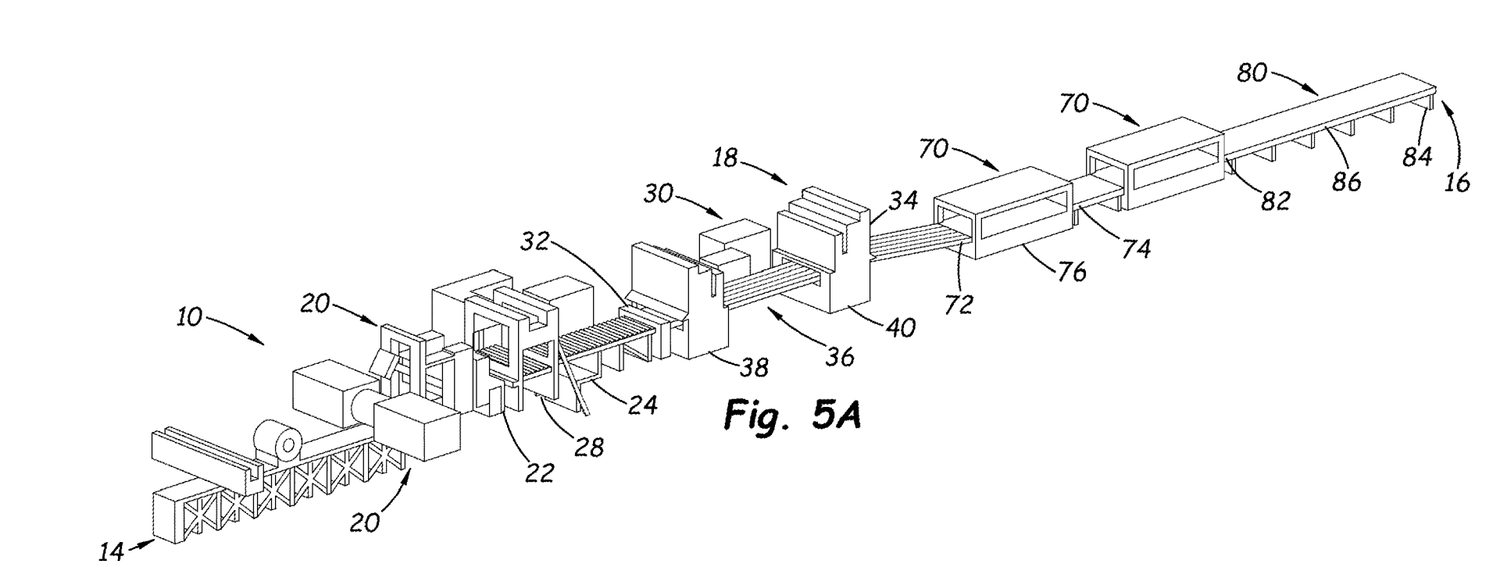
FIG. 5A is a schematic perspective diagrammatic view of yet another embodiment of the new system for producing articles from sheet material.
Figure 5B:
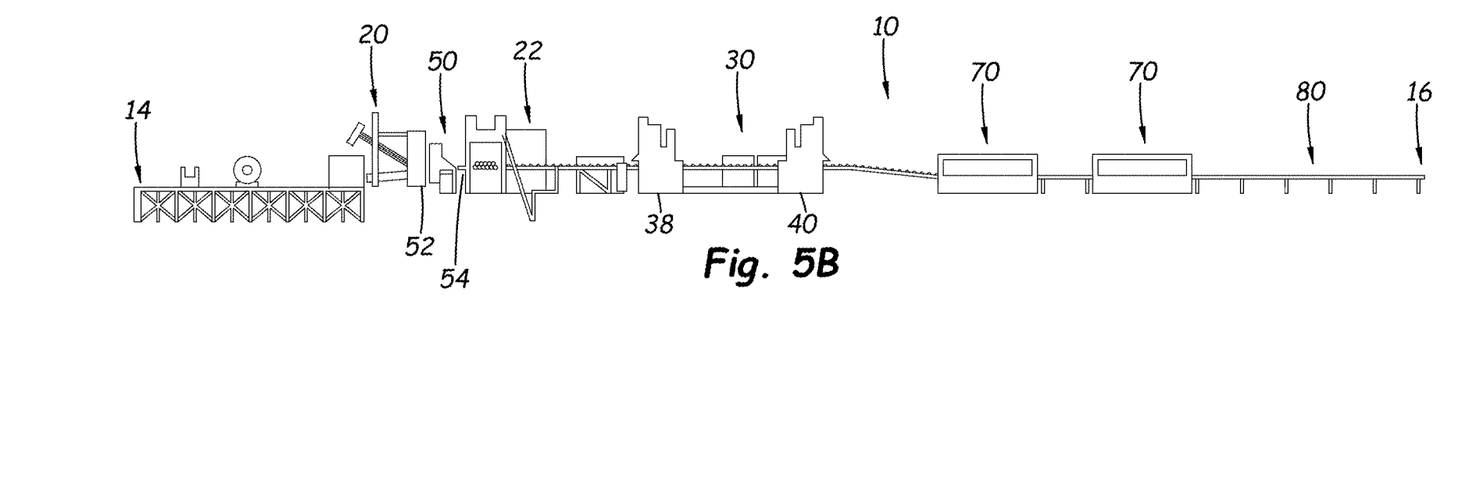
FIG. 5B is a schematic side view of the embodiment of the new system for producing articles from sheet material.
Figure 6A:
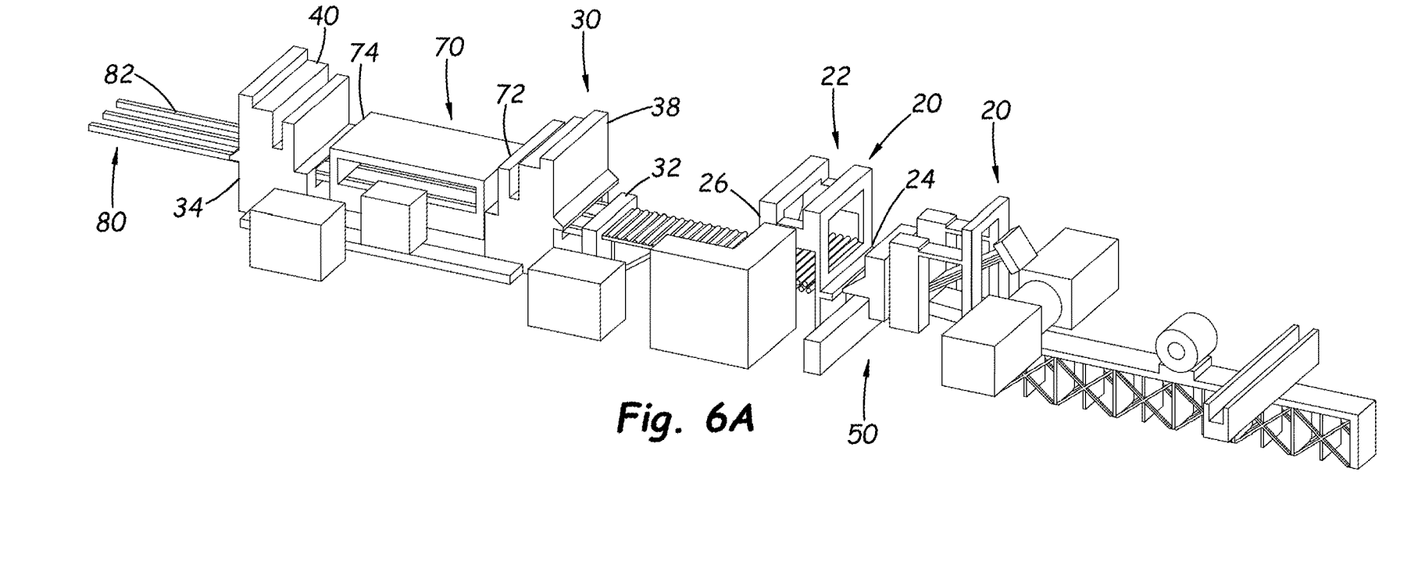
FIG. 6A is a schematic perspective diagrammatic view of yet another embodiment of the new system for producing articles from sheet material.
Figure 6B:
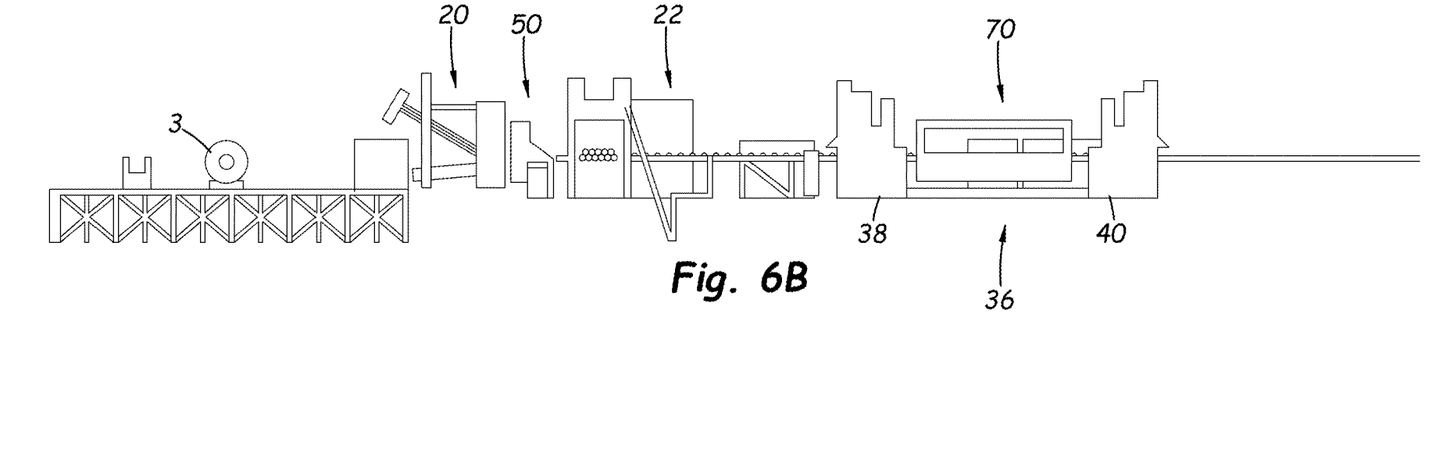
FIG. 6B is a schematic side view of the embodiment of the new system for producing articles from sheet material.

Optionally, in some implementations, the second station 30 of the system 10 may comprise a further leveler apparatus, and/or the system 10 may additionally include a third station which includes a further leveler apparatus (see, e.g., FIGS. 1 through 3). Such a further leveler apparatus may include a plurality of rolls configured to vary a length of the material path 12 from the second station entry 32 to the second station exit 34 in a manner such that the length of the path 12 at locations relatively closer to the opposite edges 6, 7 of the strip 2 of sheet material is different than the length of the material path at locations away from the opposite edges, and toward the lateral center, of the strip 2 to reduce or eliminate variations in the length of the sheet material at the edges as compared to the center which may cause undulations or unwanted contouring of the faces of the strip.

The system 10 may also include a cleaning station 50 positioned along the material path 12 and which may be configured to clean or remove foreign matter from at least a region of one of the opposite faces of the strip 2, and optionally from at least a region of both of the opposite faces of the strip. The cleaning station 50 may have a cleaning station entry 52 and a cleaning station exit 54, and the strip 2 may pass through the station 50 between the entry 54 and exit 56. The cleaning station 50 may be configured to remove impurities, such as stains, contaminants, metal oxides (e.g., rust) or mill scale, from the faces of the strip. In some embodiments, the cleaning station 50 may comprise an ablation apparatus 56 configured to ablate the face or faces of the strip of sheet material. In the illustrative embodiments, the cleaning station 50 may be located along the material path after the preliminary station 20 prior to the first 24 (and second 30) stations such that cleaning of the strip of sheet material occurs prior to the straightening or flattening operations performed by the first and/or second stations. Optionally, the cleaning station 50 may be located along the material path 12 after the first station 22, or after the second station 30 if the second station is utilized, or between the first and second stations. In light of the present disclosure, other arrangements may also become evident to those skilled in the art.

In some implementations, the ablation apparatus 56 may be configured such that the entirety, or substantially the entirety, of one or both faces of the strip 2 may be cleaned by the station 50. In other implementations, the ablation apparatus 56 may be configured to selectively clean or ablate some regions of the face and not ablate other regions of the (same) face (see, e.g., FIG. 4). For example, the ablation apparatus 56 may ablate at least one first region 60 of the first face 4 which may correspond to at least one of the part locations 8 on the first face, and may not ablate at least one second region 62 of the first face. In contrast to the first region 60, the second region 62 may not correspond to one of the part locations 8 on the first face 4 of the strip 2 such that portions of the face or faces that will not be located on a part are not cleaned. Optionally, the second region 62 of the first face may be located between one of the first regions 60 and an additional first region 64 of the first face. The selective cleaning, or ablation, of the first face 4 may also occur on the second face 5 of the strip, and the positions of the regions of the second face may generally correspond to the positions of the regions of the first face. Illustratively, in some preferred embodiments, the ablation apparatus 56 may utilize a laser to ablate foreign matter from the face or faces of the strip of sheet material.

The system 10 may include a cutting station 70 positioned along the material path and which may be configured to cut the strip 3 of sheet material, and cut the strip 3 in such a manner as to form one or more of the parts 1. The cutting station 70 may have a cutting station entry 72 and a cutting station exit 74, and the strip 2 may pass into the station 70 through the entry 42 and may continue through the station 70 with what remains of the strip 2 passing out of the exit 44.

The cutting station 70 may be configured to cut the strip 2 of sheet material along the part boundary 9 of a part 1 to separate a portion of the sheet material that forms the part (or parts) from portions of the sheet material that do not form the part (or parts). Cuts made by the cutting station 70 may be made in the one or more first regions 60, 64 of the first face of the strip of sheet material, and cuts made by the station 70 may be made at part locations 8 on the first face. Further, cuts made by the cutting station 70 may not be made in the second region 62 or regions of the first face. In some embodiments of the system 10, the cutting station may comprise a cutting apparatus 76 configured to cut through the sheet material to separate the potions of the material from each other. In some of the most preferred embodiments, the cutting apparatus 76 may utilize a laser to cut through the sheet material, although other suitable cutting technologies may be utilized.

In some implementations of the system 10, the cutting station 70 may be configured to cut the sheet material of the strip 2 into sub-portions which do not necessarily correspond to a part boundary 9, such as when a part is not being directly produced by the system 10. For example, the sub-portions formed by the cutting station 70 may have a regular polygonal boundary shape, such as a rectangular boundary shape, and may the sub-portion of the strip may form a blank to be subsequently processed into a part at a time or location remote from the cutting by the cutting station 70 of the system 10.

Optionally, implementations of the system 10 may have the cutting station 70 being located along the material path 12 after the first 24 and/or second 30 stations (see, e.g., FIGS. 2A and 2B), and may also be located after the cleaning station 50. In some implementations, the cutting station 70 may be positioned along the path 12 at a location similar to one of the stations 24, 30, such as, for example, positioning the cutting station between the parts 38, 40 of a stretching apparatus 36 of the second station 30, such that the cutting operation may be performed during or just after the stretching operation has been performed on the strip of sheet material.

The system 10 may also include a conveying station 80 positioned along the material path and which may be configured to convey parts 1 formed from the strip 2 after the cutting is performed, to a location useful for collection and conveyance, and optionally a location different than where the remnants of the strip not used for the parts are moved The conveying station 80 may be associated with the cutting station 70 in a manner such that the conveying station receives parts cut from the strip of sheet material by the cutting station. The conveying station 80 may have a conveying station entry 82 and a conveying station exit 84, and the entry 82 may be positioned adjacent to the cutting apparatus of the cutting station to receive the parts produced from the strip 2. In some embodiments, the conveying station 80 may include a conveying surface 86 for receiving the parts 1 cut from the strip of sheet material, and the surface 86 may be positioned to collect the portions of the strip forming the parts as the parts fall away from the remainder portions of the strip which do not form the parts. Illustratively, the conveying surface 86 may be movable from the conveying station entry 82 toward the conveying station exit 84, such as part of a conveyor.

The system 10 may further include a scrap station 90 positioned along the material path and which may be configured to collect the portions of the strip of sheet material cut away from the portions of the strip that form the parts. The scrap station 90 may have a scrap station entry 92 which may be positioned adjacent to the cutting station and a scrap station exit 94 which may be positioned at a location convenient for collection of the scrap pieces. The scrap station 90 may divert the non-part portions of the sheet material away from the material path 12. In some embodiments, the scrap station 90 may include a scrap collection bin for collecting the cutaway portions of the strip of sheet material.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that steps set forth in the description and/or shown in the drawing figures may be altered in a variety of ways. For example, the order of the steps may be rearranged, substeps may be performed in parallel, shown steps may be omitted, or other steps may be included, etc.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A system for producing parts from a strip of sheet material wound in a coil, the strip of sheet material having opposite faces, the system defining at least a continuous material path for movement of the strip of sheet material from a material intake to a material output, the system comprising:
    a plurality of stations between the material intake and the material output of the continuous material path, the plurality of stations including:
        a preliminary station positioned along the continuous material path at the material intake, the preliminary station being configured to hold the coil of the strip of sheet material prior to processing of the sheet material;
        a first leveling station positioned after the preliminary station along the continuous material path between the material intake and the material output of the material path, the first leveling station being configured to receive the unwound portion of the strip of sheet material moving along the material path from the preliminary station, the first leveling station being configured to manipulate the strip of sheet material passing through the first leveling station in a manner to reduce an initial degree of curvature of the strip of sheet material received from the preliminary station;
        a cleaning station positioned after the first leveling station along the continuous material path between the material intake and the material output of the material path, the cleaning station being configured to clean at least a region of one of the opposite faces of the strip of sheet material moving along the material path from the first leveling station;
        a cutting station positioned after the cleaning station along the continuous material path between the material intake and the material output, the cutting station being configured to cut parts from the strip of sheet material moving along the material path from the cleaning station to form the parts; and
        wherein the cleaning station comprises an ablation apparatus positioned along the continuous material path between the material intake and the material output of the material path, the ablation apparatus being configured to selectively ablate regions of a first said face of the strip of sheet material moving along the continuous material path.

2. The system of claim 1 wherein the material path defined by the system is linear and straight such that the strip of sheet material moves from the material intake to the material output along the material path without deviating from the linear and straight material path.

3. The system of claim 2 wherein the continuous material path is uninterrupted between the material intake and the material output.

4. The system of claim 1 wherein the first leveling station comprises a stretcher apparatus configured to manipulate the strip of sheet material by gripping the strip at two spaced locations on the strip of sheet material moving along the movement path between the material intake and the material output of the material path, the stretcher apparatus being configured for applying a tension force to a portion of the strip material located between the locations to increase the flatness of the portion of the strip between the locations.

5. The system of claim 1 wherein the first leveling station comprises a first leveler apparatus configured to manipulate the strip of sheet material moving along the movement path between the material intake and the material output of the material path, the first leveler apparatus including a plurality of rolls for engaging the opposite faces of the strip of sheet material and configured to bend the strip of sheet material in opposite directions for releasing internal stresses in the strip of sheet material.

6. The system of claim 1 wherein the plurality of stations includes a second leveling station positioned along the continuous material path between the material intake and the material output of the material path, the second leveling station being configured to receive the unwound portion of the strip of sheet material moving along the material path from the first station, the second leveling station being configured to manipulate the strip of the sheet material passing through the second station.

7. The system of claim 6 wherein the second leveling station comprises a second leveler apparatus positioned along the continuous material path between the material intake and the material output of the material path, the second leveling station being configured to manipulate the strip of sheet material, the second leveler apparatus including a plurality of rolls positioned along the material path for engaging the opposite faces of the strip of sheet material and configured to bend the strip of sheet material in opposite directions for releasing internal stresses in the strip of sheet material.

8. The system of claim 1 wherein the ablation apparatus is configured to utilize a laser to ablate the first face of the strip of sheet material.

9. The system of claim 1 wherein the cutting station comprises a cutting apparatus positioned along the continuous material path between the material intake and the material output of the material path, the ablation apparatus being configured to cut the strip of sheet material utilizing a laser to cut through the strip of sheet material moving along the continuous material path.

10. A system for producing parts from a strip of sheet material wound in a coil, the strip of sheet material having opposite faces with a uniform thickness between the opposite faces, the system defining at least a portion of a material path for movement of the strip, the system comprising:
    a plurality of stations, the plurality of stations including:
        a preliminary station configured to hold the coil of the strip of sheet material;
        a first leveling station positioned along the material path and being configured to receive the unwound portion of the strip of sheet material from the preliminary station, the first leveling station being configured to manipulate the strip of sheet material passing through the first leveling station in a manner to reduce an initial degree of curvature of the strip of sheet material received from the preliminary station such that the opposite faces are flat;
        a cleaning station positioned along the material path and being configured to clean at least a region of one of the opposite flat faces of the strip of sheet material; and
        a cutting station positioned along the material path and configured to cut the strip of sheet material to permit removal of the parts from a remainder of the sheet material remaining after removal of the parts;

wherein the parts are cut from the strip of sheet material at a plurality of part locations on the strip of sheet material;

wherein the cleaning station comprises an ablation apparatus configured to selectively ablate at least one first region of a first said flat face of the strip of sheet material, the first region of the first flat face corresponding to at least one of the part locations on the first flat face from which at least one of the parts is cut; and wherein the cleaning station is configured to not ablate at least one second region of the first flat face, the at least one second region not corresponding to one of the part locations on the first flat face of the strip of sheet material.

11. The system of claim 10 wherein the at least one second region of the first face is located between a pair of said first regions of the first face.

12. The system of claim 10 wherein the first leveling station comprises a first leveler apparatus configured to manipulate the strip of sheet material moving along the movement path between the material intake and the material output of the material path, the first leveler apparatus including a plurality of rolls for engaging the opposite faces of the strip of sheet material and configured to bend the strip of sheet material in opposite directions for releasing internal stresses in the strip of sheet material.

13. The system of claim 10 wherein the first leveling station comprises a stretcher apparatus configured to manipulate the strip of sheet material by gripping the strip at two spaced locations on the strip of sheet material moving along the movement path between the material intake and the material output of the material path, the stretcher apparatus being configured for applying a tension force to a portion of the strip material located between the locations to increase the flatness of the portion of the strip between the locations.

14. The system of claim 10 wherein the plurality of stations includes a second leveling station positioned along the continuous material path between the material intake and the material output of the material path, the second leveling station being configured to receive the unwound portion of the strip of sheet material moving along the material path from the first station, the second leveling station being configured to manipulate the strip of the sheet material passing through the second station.

15. The system of claim 14 wherein the second leveling station comprises a second leveler apparatus positioned along the continuous material path between the material intake and the material output of the material path, the second leveling station being configured to manipulate the strip of sheet material, the second leveler apparatus including a plurality of rolls positioned along the material path for engaging the opposite faces of the strip of sheet material and configured to bend the strip of sheet material in opposite directions for releasing internal stresses in the strip of sheet material.

16. The system of claim 10 wherein the ablation apparatus is configured to utilize a laser to ablate the first face of the strip of sheet material.

\* \* \* \* \*